United States Patent

Ito

[19]

[11] Patent Number: 5,901,249

[45] Date of Patent: May 4, 1999

[54] METHOD FOR COMPRESSING IMAGE SIGNALS

[75] Inventor: Wataru Ito, Kanagawa-ken, Japan

[73] Assignee: Fuji Photo Film Co., Ltd., Kanagawa-Ken, Japan

[21] Appl. No.: 08/253,857

[22] Filed: Jun. 3, 1994

[30] Foreign Application Priority Data

Jun. 4, 1993 [JP] Japan .................................. 5-134243

[51] Int. Cl.⁶ ............................................ G06K 9/36
[52] U.S. Cl. ........................................ 382/239; 382/128
[58] Field of Search .................................. 382/173, 176, 382/180, 128, 239, 243, 248, 251, 253, 433, 261.2

[56] References Cited

U.S. PATENT DOCUMENTS

| | | | |
|---|---|---|---|
| 4,494,144 | 1/1985 | Brown | 382/239 |
| 4,776,029 | 10/1988 | Shimura | 382/56 |
| 4,802,232 | 1/1989 | Altes | 382/239 |
| 4,851,678 | 7/1989 | Adachi et al. | 250/327.2 |
| 4,931,644 | 6/1990 | Adachi et al. | 250/327.2 |
| 4,967,079 | 10/1990 | Shimura | 250/327.2 |
| 5,014,198 | 5/1991 | Umemura | 382/232 |
| 5,038,389 | 8/1991 | Mizuno | 382/239 |
| 5,086,489 | 2/1992 | Shimura | 382/56 |
| 5,121,216 | 6/1992 | Chen et al. | 382/239 |
| 5,282,255 | 1/1994 | Bouik et al. | 382/239 |
| 5,488,674 | 1/1996 | Burt et al. | 382/284 |

FOREIGN PATENT DOCUMENTS

| | | | |
|---|---|---|---|
| 64-11465 | 1/1989 | Japan | H04N 1/04 |
| 243436 | 2/1990 | Japan | E04B 1/94 |

OTHER PUBLICATIONS

"Wavelets and Signal Processing" (O. Rioul and M. Vetterli, IEEE Sp Magazine, Oct. 1991, pp. 14–38).

"Zero–Crossings of a Wavelet Transform" (S. Mallat, IEEE Transactions on Information Theory, vol. 37, No. 4, Jul. 1991, pp. 1019–1033).

"Image Coding Using Wavelet Transform" (M. Antonini, et al., IEEE Transactions on Image Processing, vol. 1, No. 2, Apr. 1992, pp. 205–220).

*Primary Examiner*—Christopher S. Kelley
*Attorney, Agent, or Firm*—Sughrue, Mion, Zinn, Macpeak & Seas, PLLC

[57] ABSTRACT

Wavelet transformation is carried out on an original image signal, and the original image signal is thereby decomposed into image signals, each being of one of a plurality of different frequency bands. The degree of importance of each of different portions of the image is then determined from one of the image signals or from the original image signal. Labeling processing is carried out on the image signal, from which the degree of importance of each of different portions of the image was determined, in accordance with the determined degree of importance of each of different portions of the image. The image signals are quantized in accordance with the results of the labeling processing such that a larger number of bits may be allocated to each of picture elements in a portion of the image determined as having a higher degree of importance. The quantized image signals are then encoded. The original image signal is thus compressed with a high compressibility such that the image quality of the important portion of the original image may not be lost.

13 Claims, 7 Drawing Sheets

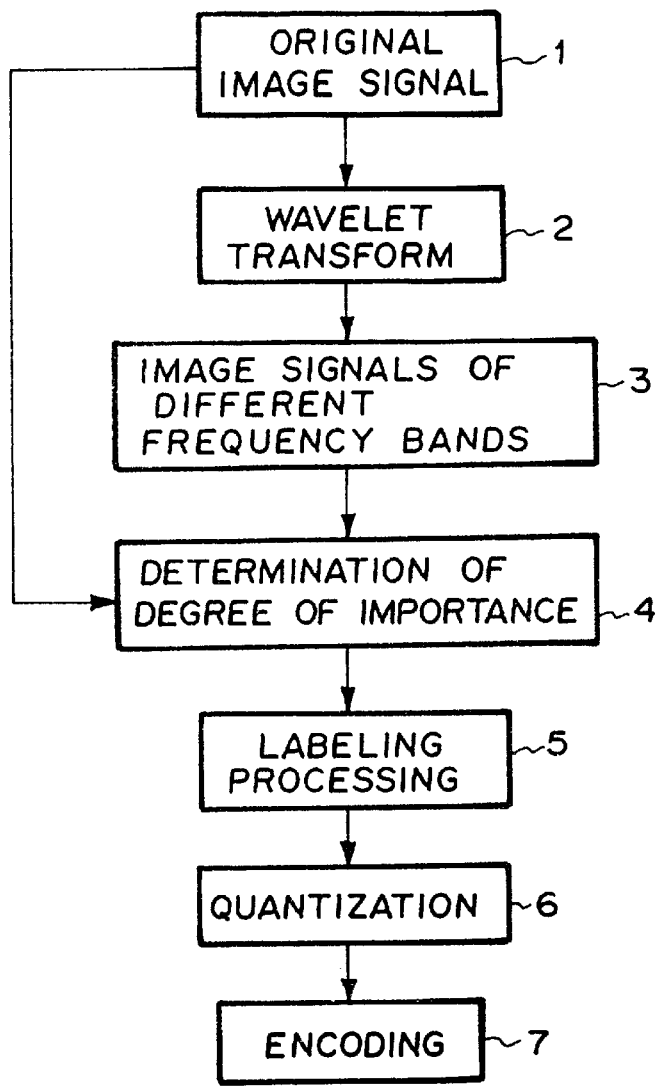
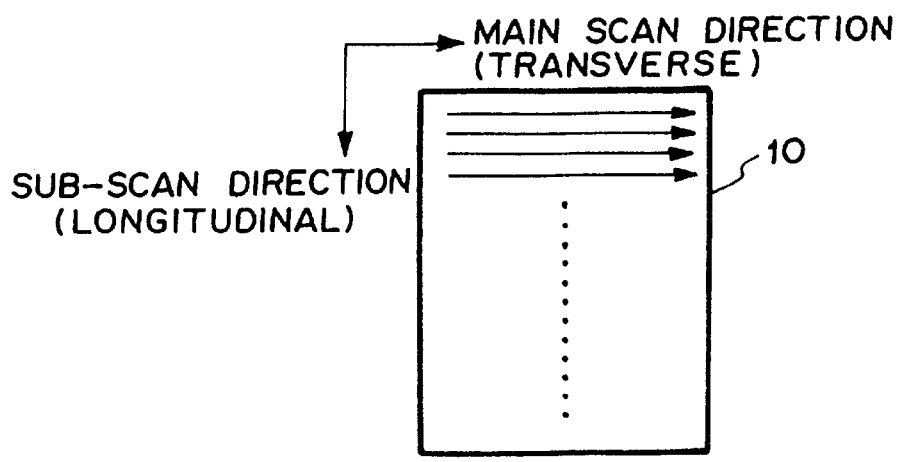

FIG. 6
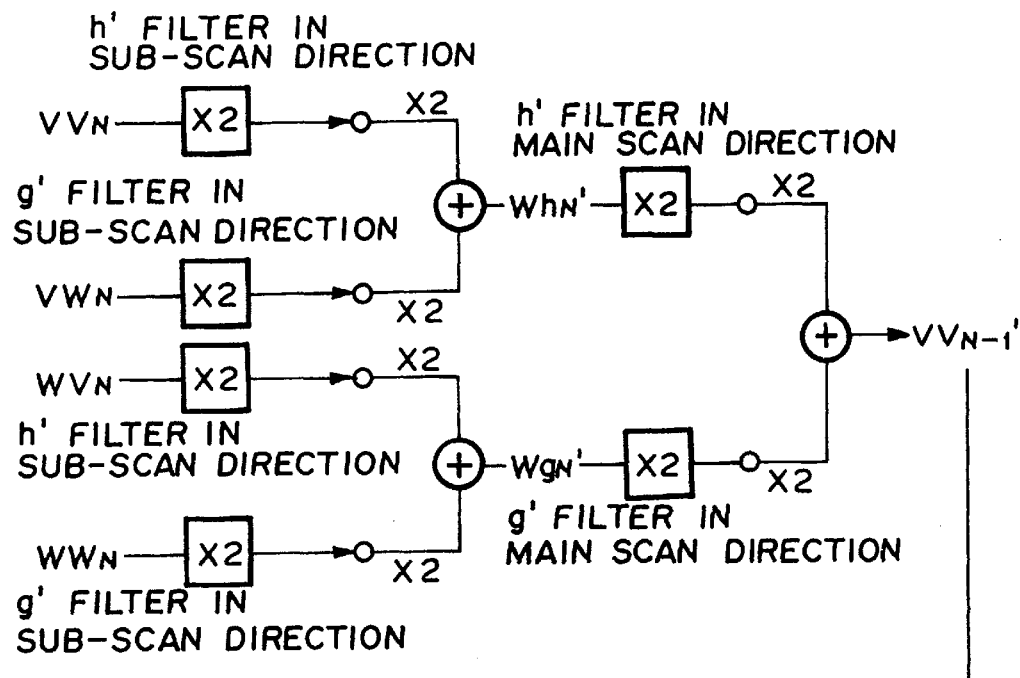
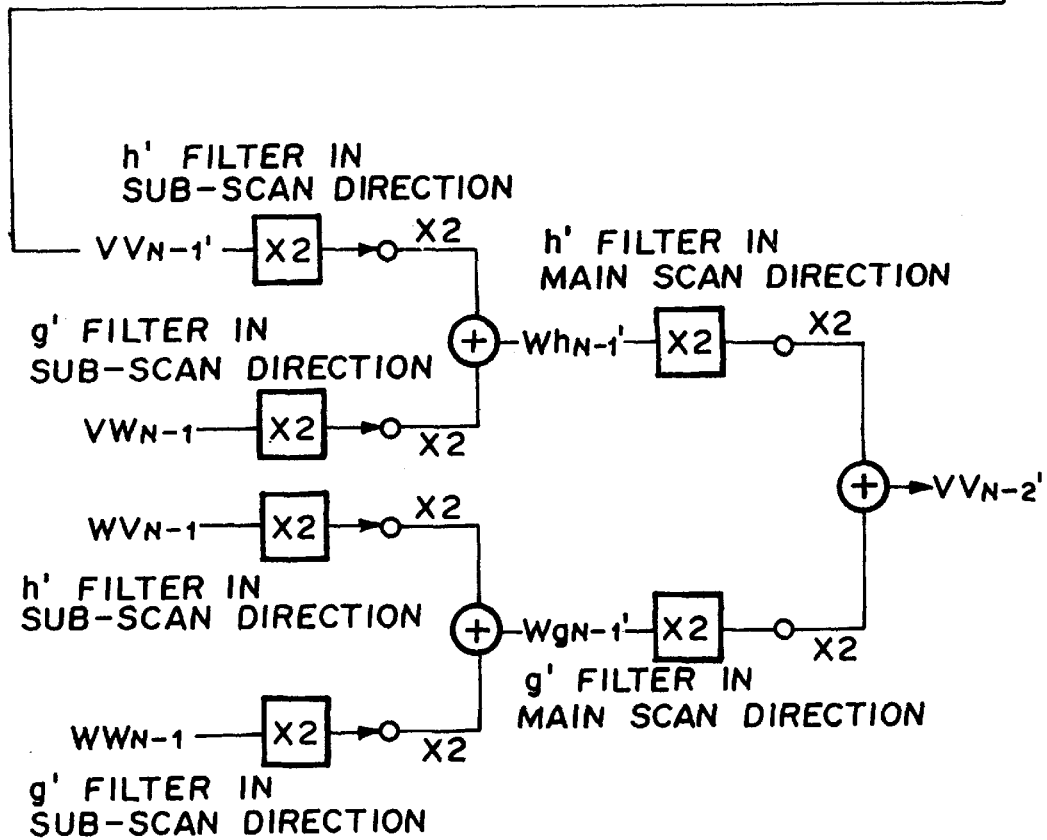

F I G. 7
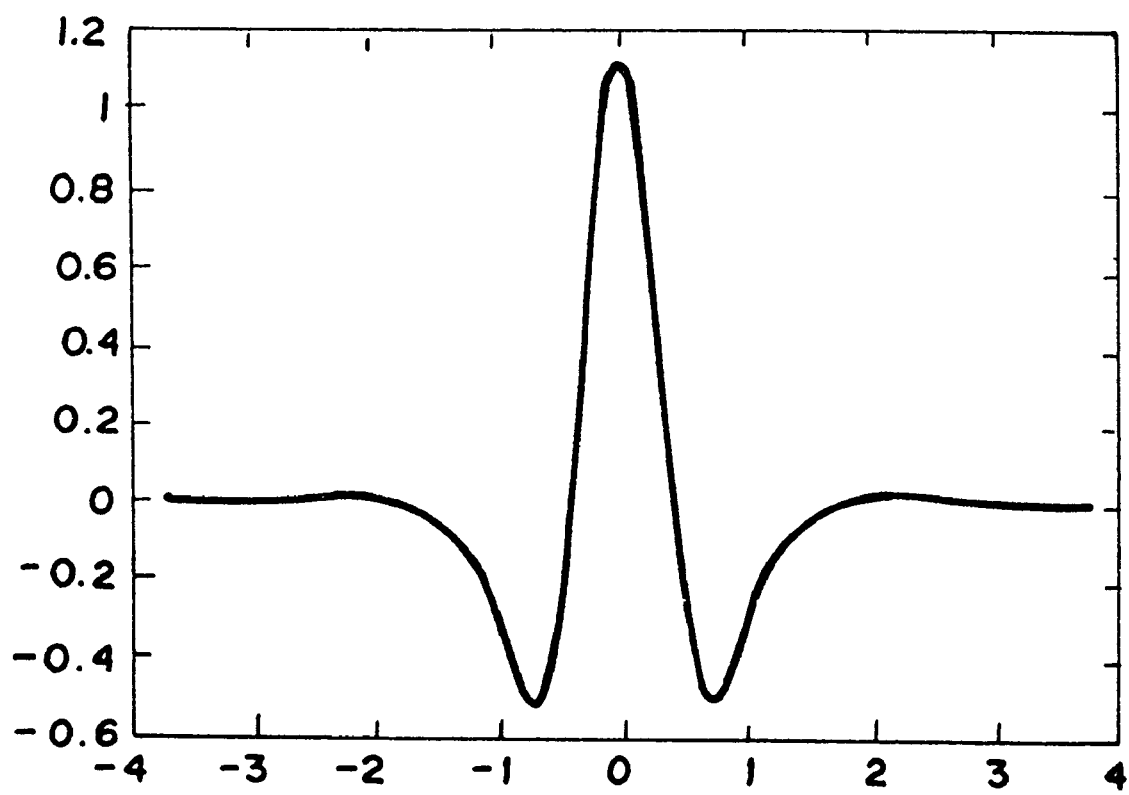

METHOD FOR COMPRESSING IMAGE SIGNALS

BACKGROUND OF THE INVENTION

1. Field of the Invention

This invention relates to a method for compressing an image signal. This invention particularly relates to a method for compressing an image signal, wherein wavelet transformation is utilized and a high signal compressibility is thereby obtained. This invention also relates to a method for reconstructing an image signal, wherein an original image signal is reconstructed from an image signal having been compressed with the method for compressing an image signal in accordance with the present invention.

2. Description of the Prior Art

Image signals representing continuous tone images, such as television signals, are composed of enormous amounts of information, and a broad-band transmission line is required for transmission of the image signals. Such image signals involve much redundancy, and various attempts have been made to compress the image signals by restricting the redundancy. Also, in recent years, recording of continuous tone images on optical disks, magnetic disks, or the like, has been generally put into practice. In such cases, image signal compression is generally carried out for the purpose of efficiently recording the image signals on a recording medium.

As one of the methods for compressing an image signal, a compressing processing method utilizing prediction encoding has heretofore been employed. Specifically, in cases where an image signal is to be stored or transmitted, the image signal is subjected to compression processing based on prediction encoding, and the amount of the image signal is thereby reduced. The compressed image signal is then stored or transmitted. When the image which is represented by the image signal is to be reproduced, the compressed image signal is subjected to decoding processing and is thereby decompressed. Thereafter, a visible image is reproduced from the decompressed image signal.

Also, as one of the methods for compressing an image signal, a method utilizing vector quantization has heretofore been used. The method comprises the steps of (i) dividing a two-dimensional image signal into blocks, each of which comprises the image signal components representing K number of picture elements adjacent to one another in the image, (ii) selecting a vector, which corresponds with the minimum distortion to the set of the image signal components in each of the blocks, from a code book composed of a plurality of vectors, which are different from one another and prepared in advance by defining K number of vector elements, and (iii) encoding the information, which represents the selected vector, in association with the block.

Since the image signal components in the block as described above have high correlation to one another, the image signal components in each block can be represented very accurately by one of a comparatively small number of vectors prepared in advance. Therefore, instead of the actual image signal being transmitted or recorded, transmission or recording of the image signal can be carried out by transmitting or recording the codes representing the vectors. In this manner, signal compression can be achieved. By way of example, the amount of the image signal components, which represent 64 picture elements in a continuous tone image having 256 levels (=8 bits) of density scale, is 8×64=512 bits. In such cases, the image signal components representing the 64 picture elements may be grouped as a single block, and the image signal components in the block may be represented by a vector, which is composed of 64 vector elements. Also, a code book including 256 such vectors may be prepared. In such cases, the amount of the information per block becomes equal to the amount of the information required to discriminate between the vectors, i.e. 8 bits. Consequently, in such cases, the amount of the signal can be compressed to 8/(8×64)=1/64.

The image signal is compressed in the manner described above, and the compressed image signal is recorded or transmitted. Thereafter, the vector elements of each of the vectors, which are represented by the vector discriminating information, are taken as reconstructing information for each of the blocks, and the original image is reproduced by using the reconstructing information.

One approach to improvement of the compressibility in the image signal compression by prediction encoding is to decrease the bit resolution (density resolution) of the image signal, i.e. to carry out quantization processing for quantizing the image signal more coarsely, in addition to prediction encoding processing.

Therefore, in U.S. Pat. No. 4,776,029, the applicant proposed a method for compressing an image signal with interpolation encoding, wherein the prediction encoding technique and the quantization technique are combined with each other. With the proposed method, image signal components of an image signal are classified into main components, which have been sampled at appropriate sampling intervals, and interpolated components other than the main components. The interpolated components are then subjected to interpolation prediction encoding processing based on the main components, i.e. the values of the interpolated components are predicted with the interpolation prediction from the main components. Thereafter, prediction errors between the predicted values and the actual values of the interpolated components are encoded into variable length codes, such as Huffman codes (i.e. are converted into codes, the lengths of which vary for different values of the prediction errors). In this manner, the image signal is compressed.

During the compression of an image signal, the image signal compressibility should be as high as possible. However, it is technically difficult to increase the compressibility markedly during the interpolation encoding. Therefore, in order for a high compressibility to be achieved, it is considered that component number decreasing processing, which results in a coarse spatial resolution, and the interpolation encoding be combined with each other.

Therefore, in U.S. Pat. No. 5,086,489, the applicant proposed a method for compressing an image signal, wherein the interpolation encoding and the component number decreasing processing are combined with each other, and wherein a high compressibility is achieved while good image quality is being kept.

As a method for processing an image signal, the so-called "wavelet transformation method" has heretofore been proposed.

How the wavelet transformation is carried out will be described hereinbelow.

The wavelet transformation has recently been developed as a frequency analysis method and has heretofore been applied to stereo pattern matching, signal compression, and the like. The wavelet transformation is described in, for example, "Wavelets and Signal Processing," by Olivier Rioul and Martin Vetterli, IEEE SP Magazine, pp. 14–38, October 1991; and "Zero-Crossings of a Wavelet Transform," by Stephane Mallat, IEEE Transactions on Information Theory, Vol. 37, No. 4, pp. 1019–1033, July 1991.

With the wavelet transformation, a signal is transformed into frequency signals, each being of one of a plurality of different frequency bands, by utilizing a function h, which is shown in FIG. 7, as a basic function and in accordance with the formula $$W(a, b) = \int_{-\infty}^{\infty} f(t)h(a, b)dt \qquad (1)$$

wherein
f(t): the signal having an arbitrary wave form,
W(a,b); the wavelet transformation of f(t), $$h(a, b) = \frac{1}{\sqrt{a}} h(at - b)$$

a: the degree of contraction of the function,
b: the amount of movement in the horizontal axis direction.

Therefore, the problems with regard to a false oscillation, which occurs with Fourier transformation, do not occur. Specifically, when filtering processing is carried out by changing the period and the degree of contraction of the function h and moving the function h on an original signal, frequency signals, each of which is adapted to one of desired frequencies ranging from a fine frequency to a coarse frequency. By way of example, FIG. 8 shows signals, which are obtained by carrying out the wavelet transformation on an original signal Sorg and then carrying out inverse wavelet transformation for each of frequency bands. FIG. 9 shows signals, which are obtained by carrying out Fourier transformation on the original signal Sorg and then carrying out inverse Fourier transformation for each of the frequency bands. As will be understood from FIGS. 8 and 9, the wavelet transformation has the advantage over the Fourier transformation in that a frequency signal of a frequency band corresponding to the oscillation of the original signal Sorg can be obtained. Specifically, with the Fourier transformation, an oscillation occurs in a part B' of a frequency band 7, which corresponds to a part B of the original signal Sorg. However, with the wavelet transformation, as in the original signal Sorg, no oscillation occurs in a part A' of a frequency band W7, which corresponds to a part A of the original signal Sorg.

Also, a method for compressing an image signal by utilizing the wavelet transformation has been proposed in, for example, "Image Coding Using Wavelet Transform" by Marc Antonini, et al., IEEE Transactions on Image Processing, Vol. 1, No. 2, pp. 205–220, April 1992.

With the proposed method, wavelet transformation is carried out on an original image signal representing an image, and the original image signal is thereby transformed into image signals, each being of one of a plurality of different frequency bands. Thereafter, vector quantization is carried out on each of the image signals such that a small number of bits per picture element may be allocated to an image signal of a high frequency band, which image signal carries much noise, and a large number of bits per picture element may be allocated to an image signal of a low frequency band, which image signal carries the information representing the major object. In this manner, the original image signal is compressed. With the proposed method, the compressibility of the original image signal can be kept high. Also, the original image can be restored perfectly by carrying out inverse wavelet transformation on the compressed image signal.

However, with the aforesaid method for compressing an image signal by utilizing the wavelet transformation, it is necessary for the image signal to be compressed by vector quantization. Therefore, if the compressibility is increased even further, there will be the risk that the image quality of the original image is lost. Thus there is a limit in the increase in the compressibility of the image signal.

SUMMARY OF THE INVENTION

The primary object of the present invention is to provide a method for compressing an image signal, wherein the image signal is compressed with a high compressibility such that the image quality of the original image represented by the image signal may not be lost.

Another object of the present invention is to provide a method for reconstructing an image signal, wherein an original image signal is reconstructed from an image signal having been compressed with the method for compressing an image signal in accordance with the present invention.

The present invention provides a method for compressing an image signal, wherein compression processing is carried out on an original image signal representing an image, in which a predetermined object image is embedded, the method comprising the steps of:

i) carrying out wavelet transformation on the original image signal, the original image signal being thereby decomposed into image signals, each being of one of a plurality of different frequency bands, ii) determining the degree of importance of each of different portions of the image from one of the image signals or from the original image signal, iii) carrying out labeling processing on the image signal, from which the degree of importance of each of different portions of the image was determined, in accordance with the determined degree of importance of each of different portions of the image, iv) quantizing the image signals in accordance with the results of the labeling processing such that a larger number of bits may be allocated to each of picture elements in a portion of the image determined as having a higher degree of importance, and v) encoding the image signals, which have thus been quantized.

The present invention also relates to a method for reconstructing an image signal, wherein an original image signal is reconstructed from an image signal having been compressed with the method for compressing an image signal in accordance with the present invention.

Specifically, the present invention also provides a method for reconstructing an image signal, wherein an original image signal is reconstructed from an image signal having been compressed with a method for compressing an image signal in accordance with the present invention, the method for reconstructing an image signal comprising the steps of:

i) decoding the image signals, which have been encoded with a method for compressing an image signal in accordance with the present invention, and ii) carrying out inverse wavelet transformation on the image signals, which have thus been decoded.

If the number of bits per picture element is set at a large value during the quantization of an image signal, the compressibility of the image signal will become low, but a compressed image signal can be obtained which represents an image close to the original image. Therefore, in such cases, the image quality of the image reconstructed from the compressed image signal can be kept good. If the number of bits per picture element is set at a small value, a large error will occur in restoring the original image signal from the compressed image signal. Such an error appears as noise in the restored image. Therefore, in such cases, the image quality of the image reconstructed from the compressed image signal becomes bad. However, in such cases, the lengths of the codes become short during the encoding, and therefore the signal compressibility can be kept high. The present invention is based on these findings.

Specifically, with the method for compressing an image signal in accordance with the present invention, wavelet transformation is carried out on the original image signal, and the original image signal is thereby decomposed into the image signals, each being of one of a plurality of different frequency bands. The degree of importance of each of different portions of the image is determined from one of the image signals. The image signals are quantized such that a larger number of bits may be allocated to each of picture elements in a of then of the image determined as having a higher degree of importance, and such that a smaller number of bits may be allocated to each of picture elements in a portion of the image determined as having a low degree of importance. Therefore, as for an important portion of the image, the image signals can be compressed such that the image quality may be kept good. As for an image portion which is not important, the image signals can be compressed with a high compressibility. Accordingly, the compressibility of the image signals can be kept high such that the image quality of the important portion of the image may not become bad.

With the method for reconstructing an image signal in accordance with the present invention, the image signals, which have been compressed with the method for compressing an image signal in accordance with the present invention, are decoded. Thereafter, inverse wavelet transformation is carried out on the image signals, which have thus been decoded. Therefore, the original image can be reproduced such that the image quality of the important portion of the image may be kept good.

BRIEF DESCRIPTION OF THE DRAWINGS

FIG. 1 is a block diagram showing a fundamental concept behind the method for compressing an image signal in accordance with the present invention, FIG. 2 is an explanatory view showing how an image signal is detected from a stimulable phosphor sheet on which an image has been stored, FIG. 6 is a flow chart showing how inverse wavelet transformation is carried out, FIG. 7 is a graph showing a basic wavelet function employed in the wavelet transformation.

DESCRIPTION OF THE PREFERRED EMBODIMENTS

The present invention will hereinbelow be described in further detail with reference to the accompanying drawings.

FIG. 1 shows a fundamental concept behind the method for compressing an image signal in accordance with the present invention. As illustrated in FIG. 1, with the method for compressing an image signal in accordance with the present invention, an original image signal representing an original image is obtained in a step 1. In a step 2, wavelet transformation is carried out on the original image signal. In this manner, in a step 3, image signals, each of which is of one of a plurality of different frequency bands, are obtained from the wavelet transformation. Thereafter, in a step 4, the degree of importance of each of different portions of the image is determined from one of the image signals, which have been obtained in the step 3, or from the original image signal, which has been obtained in the step 1. In a step 5, labeling processing is carried out on the image signal, from which the degree of importance of each of different portions of the image was determined in the step 4, in accordance with the determined degree of importance of each of different portions of the image. Thereafter, in a step 6, the image signals, which have been obtained in the step 3, are quantized in accordance with the results of the labeling processing, which has been carried out in the step 5, such that a larger number of bits may be allocated to each of picture elements in a portion of the image determined as having a higher degree of importance. In a step 7, the image signals, which have thus been quantized in the step 6, are encoded.

An embodiment of the method for compressing an image signal in accordance with the present invention will be described hereinbelow.

This embodiment is applied to an original image signal obtained in a radiation image recording and reproducing system, which utilizes a stimulable phosphor sheet. The original image signal is detected as a digital image signal by scanning a stimulable phosphor sheet, on which a radiation image of a human body has been stored, with a laser beam. As illustrated in FIG. 2, when the operation for reading out the radiation image is carried out, a stimulable phosphor sheet 10, on which the radiation image has been stored, is scanned with a laser beam in a main scanning direction (i.e., in the transverse direction). Also, the stimulable phosphor sheet 10 is moved in a sub-scanning direction (i.e., in the longitudinal direction). In this manner, the stimulable phosphor sheet 10 is scanned in two directions with the laser beam.

Thereafter, wavelet transformation is carried out on the original image signal.

Figure 3:
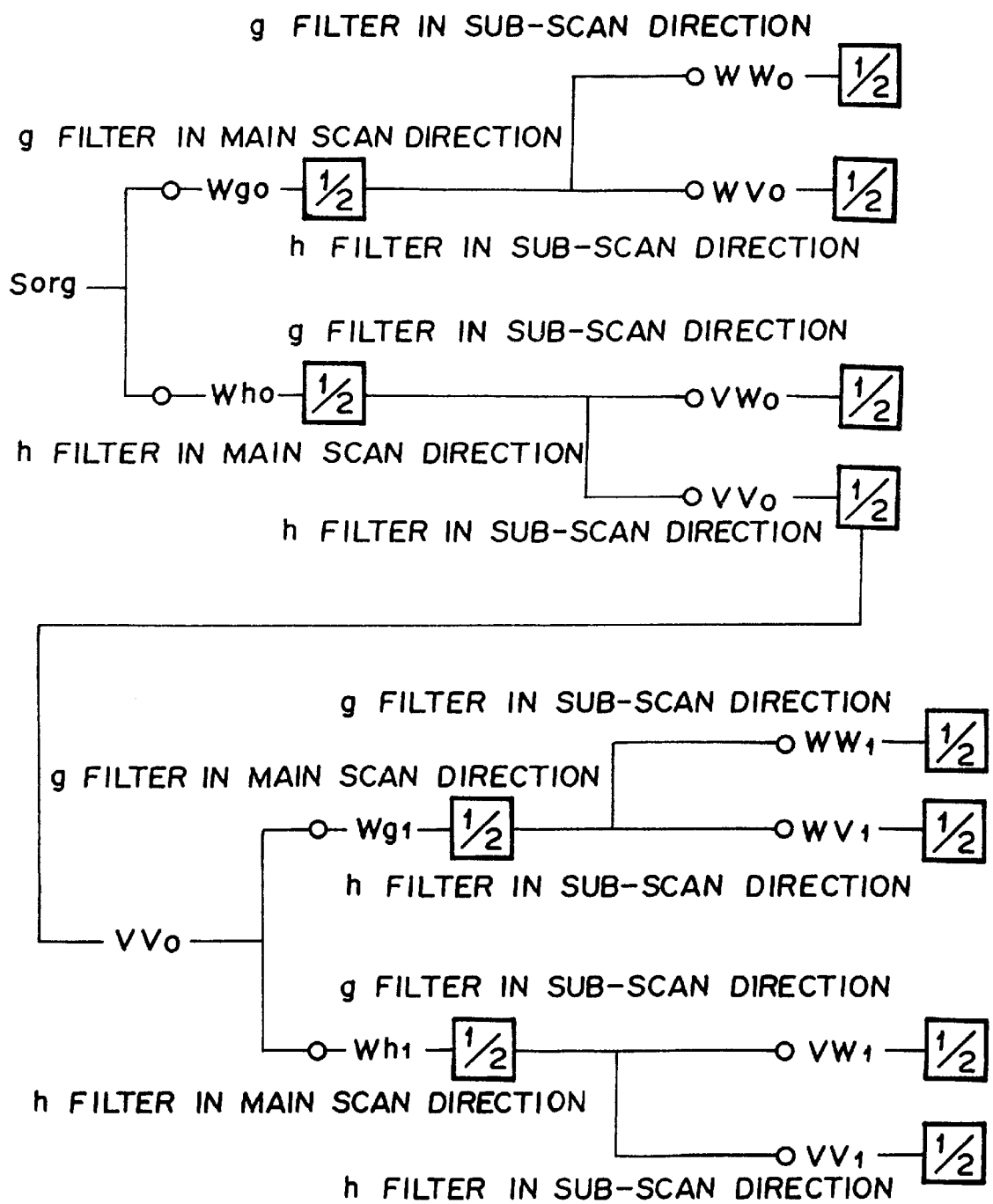
FIG. 3 is a flow chart showing how wavelet transformation is carried out.

FIG. 3 is a flow chart showing how the wavelet transformation is carried out on an original image signal Sorg.

In this embodiment, orthogonal wavelet transformation, in which the respective wavelet transformation factors are orthogonal, is carried out. The orthogonal wavelet transformation is described in the aforesaid literature of Marc Antonini, et al.

As illustrated in FIG. 3, filtering processing is carried out with a function g and a function h, which are obtained from the basic wavelet function, on the image signal components of the original image signal Sorg representing picture elements in the radiation image, which are located along the main scanning direction. Specifically, the filtering processing on the image signal components of the original image signal Sorg representing each row of the picture elements, which are arrayed along the main scanning direction, is carried out with the function g and the function h each time the position of the filtering processing is shifted by a single picture element in the sub-scanning direction. In this manner, wavelet transformation factor signals Wg0 and Wh0 with respect to the main scanning direction of the original image signal Sorg are obtained.

The function g and the function h can be uniquely obtained from the basic wavelet function. For example, the function h has the characteristics shown in Table 1 below. In Table 1, a function h' is the one which is used when inverse wavelet transformation is carried out on an image signal having been subjected to wavelet transformation. As will be understood from Formula (2), the function g can be obtained from the function h', and a function g' to be used during inverse wavelet transformation can be obtained from the function h.

TABLE 1

| n | 0 | ±1 | ±2 | ±3 | ±4 |
|---|---|---|---|---|---|
| $2^{-1/2}h$ | 0.602949 | 0.266864 | −0.078223 | −0.016864 | 0.026749 |
| $2^{-1/2}h'$ | 0.557543 | 0.295636 | −0.028772 | −0.045636 | 0 |

$$g'=(-1)^n h$$
$$g=(-1)^n h' \quad (2)$$

The wavelet transformation factor signals Wg0 and Wh0 are obtained in the manner described above. Thereafter, for each of the wavelet transformation factor signals Wg0 and Wh0, the signal components representing the picture elements located along the main scanning direction are thinned out alternately. In this manner, the number of the picture elements located along the main scanning direction is reduced to ½. Filtering processing is then carried out with the function g and the function h on the signal components of the thinned-out wavelet transformation factor signals Wg0 and Wh0, which signal components represent picture elements located along the sub-scanning direction. From the filtering processing, wavelet transformation factor signals $WW_0$, $WV_0$, $VW_0$, and $VV_0$ are obtained.

Thereafter, for each of the wavelet transformation factor signals $WW_0$, $WV_0$, $VW_0$, and $VV_0$, the signal components representing the picture elements located along the sub-scanning direction are thinned out alternately. In this manner, the number of the picture elements located along the sub-scanning direction is reduced to ½. As a result, the number of the picture elements represented by each of the wavelet transformation factor signals $WW_0$, $WV_0$, $VW_0$, and $VV_0$ becomes equal to ¼ of the number of the picture elements represented by the original image signal Sorg. Filtering processing is then carried out with the function g and the function h on the signal components of the wavelet transformation factor signal $VV_0$, which represent picture elements located along the main scanning direction.

Specifically, the filtering processing on the image signal components of the wavelet transformation factor signal $VV_0$ representing each row of the picture elements, which are arrayed along the main scanning direction, is carried out with the function g and the function h each time the position of the filtering processing is shifted by a single picture element in the sub-scanning direction. In this manner, wavelet transformation factor signals Wg1 and Wh1 with respect to the main scanning direction of the wavelet transformation factor signal $VV_0$ are obtained.

The number of the picture elements represented by the wavelet transformation factor signal $VV_0$ is equal to ½ of the number of the picture elements, which are represented by the original image signal Sorg, both in the main scanning direction and in the sub-scanning direction. Therefore, the resolution of the image represented by the wavelet transformation factor signal $VV_0$ is equal to ½ of the resolution of the image represented by the original image signal Sorg. Accordingly, as a result of the filtering processing carried out with the function g and the function h on the wavelet transformation factor signal $VV_0$, the wavelet transformation factor signals Wg1 and Wh1 representing the frequency components, which are lower than the frequency components represented by the wavelet transformation factor signal $VV_0$ and which are among the frequency components of the original image signal Sorg, are obtained.

The wavelet transformation factor signals Wg1 and Wh1 are obtained in the manner described above. Thereafter, for each of the wavelet transformation factor signals Wg1 and Wh1, the signal components representing the picture elements located along the main scanning direction are thinned out alternately. In this manner, the number of the picture elements located along the main scanning direction is reduced even further to ½. Filtering processing is then carried out with the function g and the function h on the signal components of the thinned-out wavelet transformation factor signals Wg1 and Wh1, which signal components represent picture elements located along the sub-scanning direction. From the filtering processing, wavelet transformation factor signals $WW_1$, $WV_1$, $VW_1$, and $VV_1$ are obtained.

Thereafter, for each of the wavelet transformation factor signals $WW_1$, $WV_1$, $VW_1$, and $VV_1$, the signal components representing the picture elements located along the sub-scanning direction are thinned out alternately. In this manner, the number of the picture elements located along the sub-scanning direction is reduced to ½. As a result, the number of the picture elements represented by each of the wavelet transformation factor signals $WW_1$, $WV_1$, $VW_1$, and $VV_1$ becomes equal to ¹⁄₁₆ of the number of the picture elements represented by the original image signal Sorg.

Thereafter, in the same manner as that described above, filtering processing is carried out with the function g and the function h on the signal components of the thinned-out wavelet transformation factor signal $VV_1$, which represent picture elements located along the main scanning direction. Then, for each of the wavelet transformation factor signals, which have thus been obtained, the signal components representing the picture elements located along the main scanning direction are thinned out alternately. Filtering processing is then carried out with the function g and the function h on the signal components of the thinned-out wavelet transformation factor signals, which signal components represent picture elements located along the sub-scanning direction. From the filtering processing, wavelet transformation factor signals $WW_2$, $WV_2$, $VW_2$, and $VV_2$ are obtained.

The wavelet transformation described above is iterated N number of times, and wavelet transformation factor signals $WW_0$ through $WW_N$, $WV_0$ through $WV_N$, $VW_0$ through $VW_N$, and $VV_N$ are thereby obtained. The number of the picture elements represented by each of the wavelet transformation factor signals $WW_N$, $WV_N$, $VW_N$, and $VV_N$, which are obtained from the N'th wavelet transformation, is equal to $(½)^N$ of the number of the picture elements, which are represented by the original image signal Sorg, both in the main scanning direction and in the sub-scanning direction. Therefore, as the value of N becomes larger, each wavelet transformation factor signal is of a lower frequency band and represents lower frequency components among the frequency components of the original image signal Sorg.

Accordingly, a wavelet transformation factor signal $WW_i$ (wherein i=0 to N, this also applies to the descriptions below) represents a change in the frequency of the original image signal Sorg both in the main scanning direction and in the sub-scanning direction. As the value of i becomes larger, the wavelet transformation factor signal $WW_i$ becomes a lower frequency signal. A wavelet transformation factor signal $WV_i$ represents a change in the frequency of the original image signal Sorg in the main scanning direction. As the value of i becomes larger, the wavelet transformation factor signal $WV_i$ becomes a lower frequency signal. A wavelet transformation factor signal $VW_i$ represents a change in the frequency of the original image signal Sorg in the sub-scanning direction. As the value of i becomes larger, the wavelet transformation factor signal $VW_i$ becomes a lower frequency signal.

Figure 4:
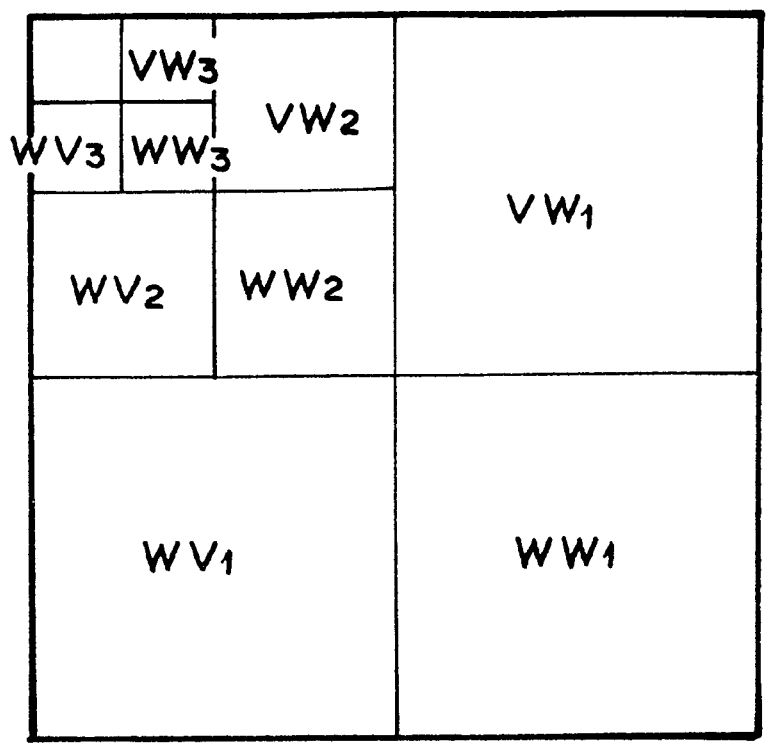
FIG. 4 is an explanatory view showing wavelet transformation factor signals.

FIG. 4 shows the wavelet transformation factor signals for the respective frequency bands. As an aid in facilitating the explanation, the wavelet transformation factor signals obtained from the first, second, and third wavelet transformations. In FIG. 4, the wavelet transformation factor signal $WW_3$ represents an image, which is obtained by reducing the original image to $(\frac{1}{2})^3$ in each of the main scanning direction and the sub-scanning direction.

Figure 5A:
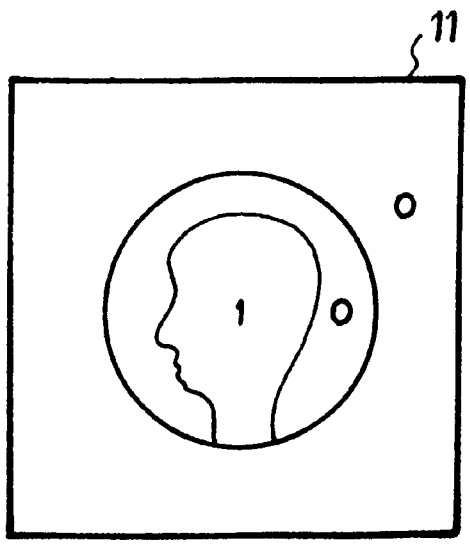
FIGS. 5A and 5B are explanatory views showing radiation images.

Thereafter, the degree of importance of each of different portions of the image, which is represented by the wavelet transformation factor signal $WW_N$, is determined from the wavelet transformation factor signal $WW_N$, which has been obtained from the N'th wavelet transformation and which is of the lowest frequency band. The labeling processing is then carried out on the wavelet transformation factor signal $WW_N$ in accordance with the determined degree of importance of each of different portions of the image. Specifically, the shape and location of an irradiation field, the object image region, and the like, are determined from the wavelet transformation factor signal $WW_N$. In this manner, it is determined what is embedded in the image represented by the wavelet transformation factor signal $WW_N$. For example, as illustrated in FIG. 5A, in cases where a radiation image 11 of the head of a human body is recorded by using an irradiation field stop, the information about the head pattern in the image is most important, and the information about the background region is not necessary. Therefore, the shape and location of the irradiation field are determined.

The applicant proposed various methods for determining the shape and location of an irradiation field in, for example, U.S. Pat. Nos. 4,851,678, 4,931,644 and 4,967,079 and Japanese Unexamined Patent Publication Nos. 64(1989)-11465, and 2(1990)-43436. For example, with the method proposed in U.S. Pat. No. 4,967,079, prospective edge points located at the boundary between the region inside of an irradiation field and the region outside of the irradiation field are detected from an image signal, and it is determined that the region surrounded by lines connecting the thus detected prospective edge points is the irradiation field. With the proposed method, even if the irradiation field has a rectangular shape, an irregular polygonal shape, or a shape surrounded by a curve, such as a circle or an ellipse, the shape and the location of the irradiation field can be determined accurately.

The method proposed in Japanese Unexamined Patent Publication No. 64(1989)-11465 comprises the steps of:

i) on each of a plurality of radial lines, each of which connects a predetermined point located in the region inside of an irradiation field on a recording medium with an edge of the recording medium, detecting a single prospective contour point, which is considered to be at the intersection of each of the radial lines and the contour of the irradiation field on the recording medium, or a plurality of such prospective contour points, together with prospectiveness ranks of the prospective contour points, on the basis of the image signal components corresponding to the picture elements arrayed along each of the radial lines, ii) in cases where the prospective contour points detected on each of the radial lines are present in both a predetermined peripheral region close to the edge of the recording medium and a center region inward from the peripheral region, and a prospective contour point of the first prospectiveness rank is present in the peripheral region, changing the prospectiveness ranks of the prospective contour points so that the first prospectiveness rank is assigned to a prospective contour point which has the highest rank among the prospective contour points located in the center region, and iii) determining the shape and location of the irradiation field on the basis of the first-ranking prospective contour points which are thus determined on the lines.

With the proposed method, accurate results can be obtained even if the image of a foreign substance is recorded together with the image of an object.

Figure 5B:
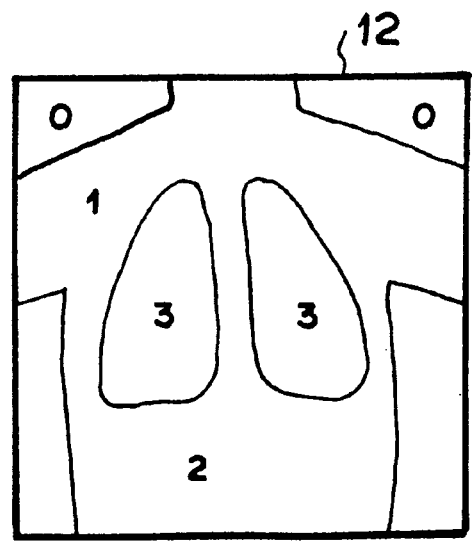
Figure 8:
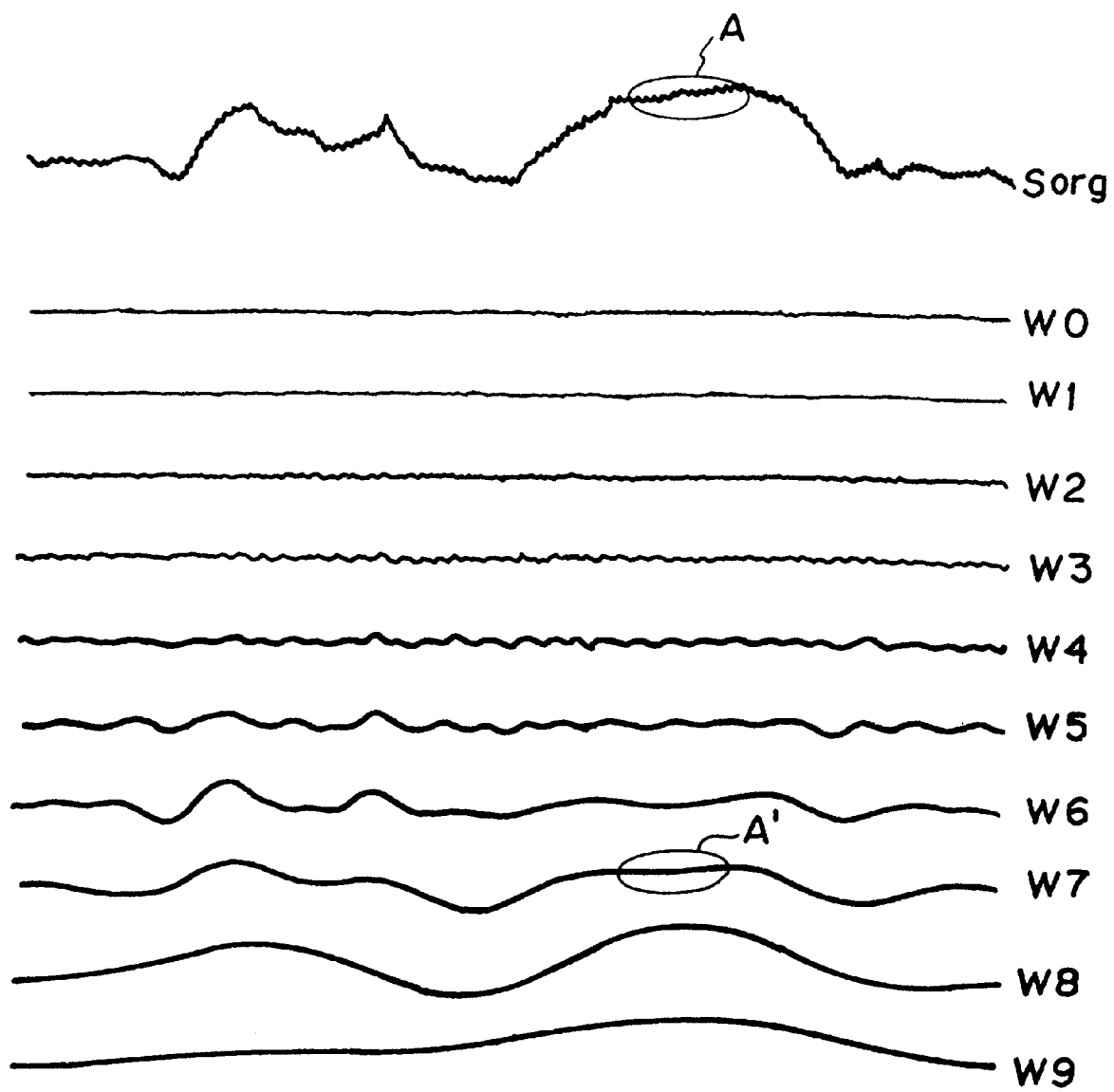
FIG. 8 is a diagram showing signals, which are obtained by carrying out the wavelet transformation on an original signal Sorg and then carrying out inverse wavelet transformation for each of frequency bands.
Figure 9:
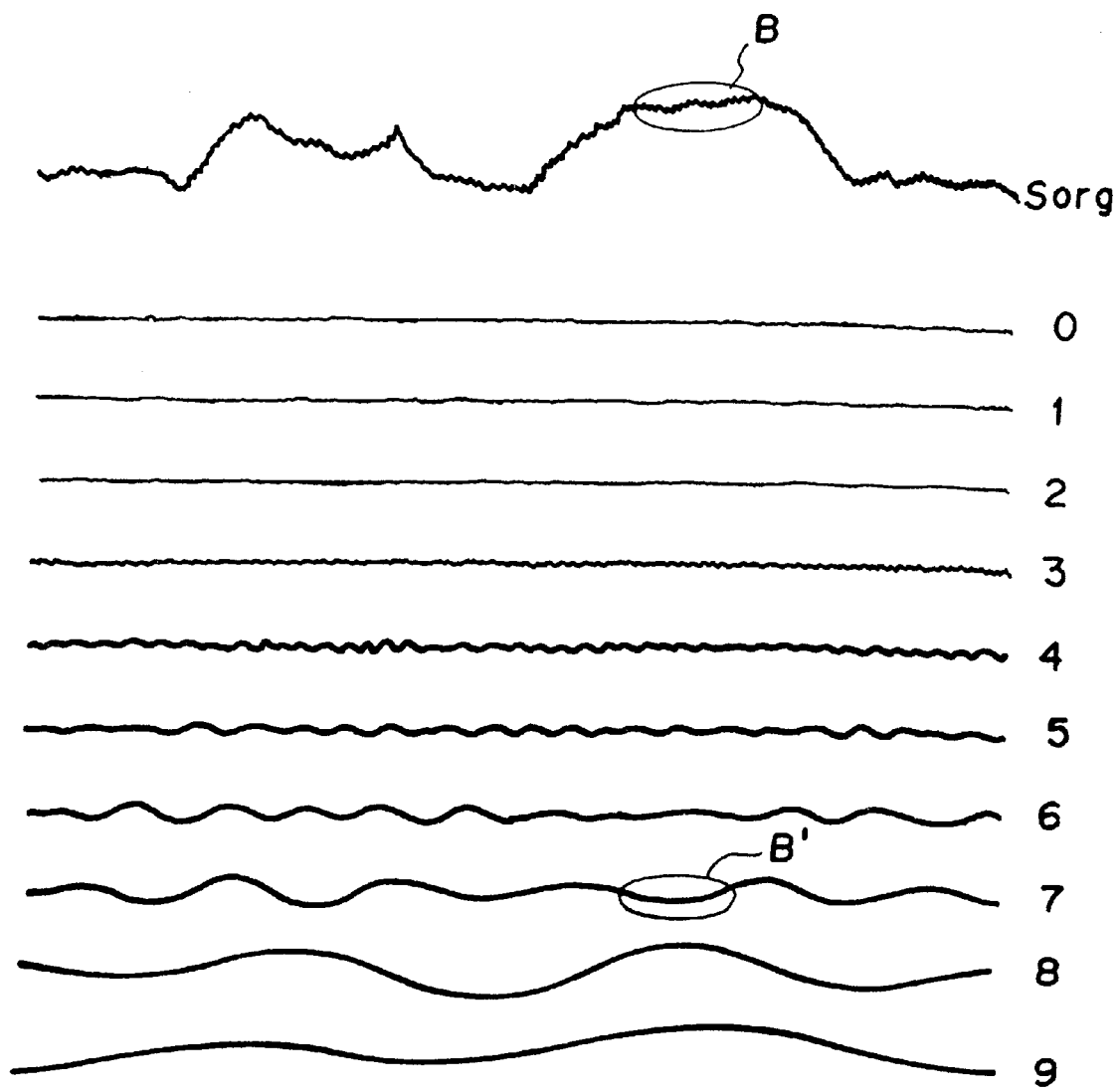
FIG. 9 is a diagram showing signals, which are obtained by carrying out Fourier transformation on the original signal Sorg and then carrying out inverse Fourier transformation for each of the frequency bands.

After the shape and location of the irradiation field have been determined in the manner described above, an analysis of the probability density function of the image signal, or the like, is carried out on the image signal components corresponding to the region inside of the irradiation field. In this manner, the head pattern in the radiation image is detected. The labeling processing is then carried out such that a value of 1 may be assigned to the head pattern, and a value of 0 may be assigned to the other regions. As illustrated in FIG. 5B, in cases where a radiation image 12 of the chest of a human body is recorded, the information about the lung field patterns is most important, the information about the patterns other than the lung field patterns is not very important, and the information about the background region is not necessary. Therefore, as a result of an analysis of the probability density function of the image signal, or the like, the lung field patterns, the patterns other than the lung field patterns, and the background region are detected. The labeling processing is then carried out such that a larger value may be assigned to a more important image pattern. For example, a value of 3 may be assigned to the lung field patterns, a value of 2 may be assigned to the patterns other than the lung field patterns, and a value of 1 may be assigned to the background region.

Thereafter, quantization is carried out on the wavelet transformation factor signals $WV_i$, $VW_i$, and $WW_i$. The wavelet transformation factor signals $WV_i$, $VW_i$, and $WW_i$ represent the reduced images obtained from the original image. Therefore, the labels assigned to the wavelet transformation factor signal $WW_N$ also apply to the wavelet transformation factor signals $WV_i$, $VW_i$, and $WW_i$. Accordingly, when the wavelet transformation factor signals $WV_i$, $VW_i$, and $WW_i$ are quantized, the number of bits per picture element is changed in accordance with the results of the labeling processing.

Specifically, in the image illustrated in FIG. 5A, the pattern of the head of the human body carries important information. Therefore, the signal components representing the head pattern are quantized such that the density scale of each picture element may be of 256 levels (=8 bits). As for the regions other than the head pattern, which are not very important, the signal components representing the regions other than the head pattern are quantized by reducing the number of bits per picture element to, for example, 4 bits. As for the image shown in FIG. 5B, the quantization is carried out by allocating 8 bits to each of the picture elements in the lung field patterns, by allocating 4 bits to each of the picture elements in the patterns other than the lung field patterns, and by allocating 1 to each of the picture elements in the background region.

If a large number of bits are allocated per picture element during the quantization of an image signal, the image signal can be compressed such that an image close to the original image can be restored from the compressed image signal, but the compressibility cannot be kept high. If a small number of bits are allocated per picture element during the quantization of an image signal, the compressibility can be kept high. However, in such cases, large errors will occur in restoring an image from the compressed image signal, and the restored image will contain more noise than in the original image.

Therefore, in the method for compressing an image signal in accordance with the present invention, the quantization is carried out such that a small number of bits per picture element may be allocated to an image signal of a high frequency band, which image signal carries much noise, and a large number of bits per picture element may be allocated to an image signal of a low frequency band, which image signal carries the information representing the major object. Also, for each of the wavelet transformation factor signals $WV_i$, $VW_i$, and $WW_i$, the number of bits per picture element is not kept the same over the entire wavelet transformation factor signal. Specifically, a large number of bits are allocated to each of picture elements in an important portion of the image, which is represented by each of the wavelet transformation factor signals $WV_i$, $VW_i$, and $WW_i$, such that the image quality of the important portion of the image may be kept good. Also, a small number of bits are allocated to each of picture elements in an unimportant portion of the image, which is represented by each of the wavelet transformation factor signals $WV_i$, $VW_i$, and $WW_i$, such that the compressibility may be kept high. In this manner, as a whole, the compressibility is kept high, while the image quality of the major portion of the image is being kept good.

Each of the wavelet transformation factor signals $WV_i$, $VW_i$, and $WW_i$ is quantized in the manner described above. Thereafter, the compression processing is carried out with the encoding, such as Huffman encoding and prediction encoding.

In the embodiment described above, the level of quantization is kept constant for each label. Alternatively, the level of quantization may be changed for different frequency bands. For example, the number of bits per picture element for quantization may be reduced even further for a high frequency band. Also, as the level of quantization, the number of bits per picture element may be set to be zero. In such cases, the length of code becomes zero, and therefore a high compressibility can be obtained.

The image signal, which has thus been obtained by encoding and compressing the original image signal Sorg, is stored on a recording medium, such as an optical disk, or is transmitted.

How the original image signal Sorg is reconstructed from the compressed image signal will be described hereinbelow.

First, the decoding with respect to the Huffman encoding, prediction encoding, and the like, is carried out on the compressed image signal. In this manner, the wavelet transformation factor signals $WV_i$, $VW_i$, and $WW_i$ are obtained.

Thereafter, the inverse wavelet transformation is carried out on the wavelet transformation factor signals $WV_i$, $VW_i$, and $WW_i$, which have been obtained from the decoding.

FIG. 6 is a flow chart showing how inverse wavelet transformation is carried out.

As illustrated in FIG. 6, each of the wavelet transformation factor signals $VV_N$, $VW_N$, $WV_N$, and $WW_N$ is subjected to the processing for leaving a space, which has a length equal to the length of a single picture element, between adjacent picture elements located along the sub-scanning direction. (In FIG. 6, this processing is expressed as ×2.) Filtering processing is then carried out with a function h', which is different from the aforesaid function h, on the signal components of the wavelet transformation factor signal $VV_N$ provided with the spaces, which signal components represent picture elements located along the sub-scanning direction. Also, filtering processing is carried out with a function g', which is different from the aforesaid function g, on the signal components of the wavelet transformation factor signal $VW_N$ provided with the spaces, which signal components represent picture elements located along the sub-scanning direction.

Specifically, the filtering processing on the image signal components of the wavelet transformation factor signal $VV_N$ representing each column of the picture elements, which are arrayed along the sub-scanning direction, is carried out with the function h' each time the position of the filtering processing is shifted by a single picture element in the main scanning direction. Also, the filtering processing on the image signal components of the wavelet transformation factor signal $VW_N$ representing each column of the picture elements, which are arrayed along the sub-scanning direction, is carried out with the function g' each time the position of the filtering processing is shifted by a single picture element in the main scanning direction. In this manner, inverse wavelet transformation factor signals are obtained from the wavelet transformation factor signals $VV_N$ and $VW_N$. The inverse wavelet transformation factor signals are then doubled and added to each other. In this manner, an inverse wavelet transformation factor signal WhN' is obtained.

As described above, the function for the wavelet transformation and the function for the inverse wavelet transformation are different from each other. Specifically, it is difficult to design functions, which become identical in the wavelet transformation and the inverse wavelet transformation, i.e. which are the orthogonal functions. Therefore, it is necessary to relieve the conditions of orthogonality, continuity, shortness of function, or symmetry. Accordingly, in this embodiment, the conditions of orthogonality are relieved, and the functions satisfying the other conditions are thereby selected.

As described above, in this embodiment, the functions h and g for the wavelet transformation and the functions h' and g' for the inverse wavelet transformation are biorthogonal different functions. Therefore, the original image signal can be perfectly restored by subjecting the wavelet transformation factor signals $VV_i$, $VW_i$, $WV_i$, and $WW_i$ to inverse wavelet transformation with the functions h' and g'.

Also, filtering processing is carried out with the function h' on the signal components of the wavelet transformation factor signal $WV_N$, which represent picture elements located along the sub-scanning direction. Also, filtering processing is carried out with the function g' on the signal components of the wavelet transformation factor signal $WW_N$, which represent picture elements located along the sub-scanning direction. In this manner, inverse wavelet transformation factor signals are obtained from the wavelet transformation factor signals $WV_N$ and $WW_N$. The inverse wavelet transformation factor signals are then doubled and added to each other. In this manner, an inverse wavelet transformation factor signal WgN' is obtained.

Thereafter, each of the inverse wavelet transformation factor signals WhN' and WgN' is subjected to the processing for leaving a space, which has a length equal to the length of a single picture element, between adjacent picture elements located along the main scanning direction. Filtering processing is then carried out with the function h' on the signal components of the inverse wavelet transformation factor signal WhN', which represent picture elements located along the main scanning direction. Also, filtering processing is carried out with the function g' on the signal components of the inverse wavelet transformation factor signal WgN', which represent picture elements located along the main scanning direction. In this manner, inverse wavelet transformation factor signals are obtained from the inverse wavelet transformation factor signals WhN' and WgN'. The inverse wavelet transformation factor signals, which have thus been obtained, are then doubled and added to each other. In this manner, an inverse wavelet transformation factor signal $VV_{N-1}'$ is obtained.

Thereafter, each of the inverse wavelet transformation factor signal $VV_{N-1}'$ and the wavelet transformation factor signals $VW_{N-1}$, $WV_{N-1}$, and $WW_{N-1}$ is subjected to the processing for leaving a space, which has a length equal to the length of a single picture element, between adjacent picture elements located along the sub-scanning direction. Filtering processing is then carried out with the function h' on the signal components of the inverse wavelet transformation factor signal $VV_{N-1}'$, which represent picture elements located along the sub-scanning direction. Also, filtering processing is carried out with the function g' on the signal components of the wavelet transformation factor signal $VW_{N-1}$, which represent picture elements located along the sub-scanning direction.

Specifically, the filtering processing on the image signal components of the inverse wavelet transformation factor signal $VV_{N-1}'$ representing each column of the picture elements, which are arrayed along the sub-scanning direction, is carried out with the function h' each time the position of the filtering processing is shifted by a single picture element in the main scanning direction. Also, the filtering processing on the image signal components of the wavelet transformation factor signal $VW_{N-1}$ representing each column of the picture elements, which are arrayed along the sub-scanning direction, is carried out with the function g' each time the position of the filtering processing is shifted by a single picture element in the main scanning direction. In this manner, inverse wavelet transformation factor signals are obtained from the inverse wavelet transformation factor signal $VV_{N-1}'$ and the wavelet transformation factor signal $VW_{N-1}$. The inverse wavelet transformation factor signals, which have been obtained in this manner, are then doubled and added to each other. In this manner, an inverse wavelet transformation factor signal WhN-1' is obtained.

Also, filtering processing is carried out with the function h' on the signal components of the wavelet transformation factor signal $WV_{N-1}$, which represent picture elements located along the sub-scanning direction. Also, filtering processing is carried out with the function g' on the signal components of the wavelet transformation factor signal $WW_{N-1}$, which represent picture elements located along the sub-scanning direction. In this manner, inverse wavelet transformation factor signals are obtained from the wavelet transformation factor signals $WV_{N-1}$ and $WW_{N-1}$. The inverse wavelet transformation factor signals, which have been obtained in this manner, are then doubled and added to each other. In this manner, an inverse wavelet transformation factor signal WgN-1' is obtained.

Thereafter, each of the inverse wavelet transformation factor signals WhN-1' and WgN-1' is subjected to the processing for leaving a space, which has a length equal to the length of a single picture element, between adjacent picture elements located along the main scanning direction. Filtering processing is then carried out with the function h' on the signal components of the inverse wavelet transformation factor signal WhN-1', which represent picture elements located along the main scanning direction. Also, filtering processing is carried out with the function g' on the signal components of the inverse wavelet transformation factor signal WgN-1', which represent picture elements located along the main scanning direction. In this manner, inverse wavelet transformation factor signals are obtained from the inverse wavelet transformation factor signals WhN-1' and WgN-1'. The inverse wavelet transformation factor signals, which have been obtained in this manner, are then doubled and added to each other. In this manner, an inverse wavelet transformation factor signal $VV_{N-2}'$ is obtained.

Thereafter, inverse wavelet transformation factor signals $VV_i'$ (wherein i=-1 to N) are sequentially created, and an inverse wavelet transformation factor signal $VV_{-1}'$ is finally obtained. The finally obtained inverse wavelet transformation factor signal $VV_{-1}'$ serves as an image signal representing the original image signal Sorg.

The inverse wavelet transformation factor signal $VV_{-1}'$ which has thus been obtained is fed into an image reproducing apparatus (not shown) and is used for the reproduction of a visible radiation image.

The image reproducing apparatus may be a display device, such as a cathode ray tube (CRT) display device, or a recording apparatus for recording an image on photosensitive film by scanning the photosensitive film with a light beam.

In cases where the image shown in FIG. 5A is reproduced, the portions other than the head pattern in the image contain much noise. Also, in cases where the image shown in FIG. 5B is reproduced, the portions other than the lung field patterns in the image contain much noise. However, in such cases, the portions other than the head pattern in the image and the portions other than the lung field patterns in the image do not carry important information, and therefore no problem will occur due to noise contained in these portions.

In the manner described above, the wavelet transformation is carried out on the original image signal Sorg, and the original image signal Sorg is thereby decomposed into the image signals, each being of one of the plurality of different frequency bands. The image signals are then quantized such that a larger number of bits may be allocated to each of picture elements in a portion of the image determined as having a higher degree of importance, and such that a smaller number of bits may be allocated to each of picture elements in a portion of the image determined as having a low degree of importance. Therefore, the compressibility of the image signals can be kept high such that the image quality of the important portion of the image may not become bad.

In the embodiment described above, the functions having the characteristics shown in Table 1 are employed as the functions h and h' for the wavelet transformation. Alternatively, the functions having the characteristics shown in Table 2 or Table 3 may be employed as the functions h and h' for the wavelet transformation.

TABLE 2

| n | 0 | ±1 | ±2 | ±3 | ±4 |
|---|---|---|---|---|---|
| $2^{-1/2}h$ | 0.6 | 0.25 | −0.05 | 0 | 0 |
| $2^{-1/2}h'$ | 17/28 | 73/280 | −3/56 | −3/280 | 0 |

TABLE 3

| n | 0 | ±1 | ±2 | ±3 | ±4 |
|---|---|---|---|---|---|
| $2^{-1/2}h$ | 45/64 | 19/64 | −1/8 | −3/64 | 3/128 |
| $2^{-1/2}h'$ | 1/2 | 1/4 | 0 | 0 | 0 |

Also, any of other functions, which can carry out the wavelet transformation, may be employed. For example, functions, which are not biorthogonal nor symmetric, but which are orthogonal, may be employed.

The wavelet transformation may be carried out by using the functions, each of which is symmetric with respect to the axis of n=0 as shown in Table 1, 2, or 3, or functions, each of which is asymmetric with respect to the axis of n=0. In cases where the wavelet transformation has been carried out by using the functions, each of which is asymmetric with respect to the axis of n=0, the inverse wavelet transformation is carried out by using the functions, which are obtained by inverting the functions used for the wavelet transformation with respect to the axis of n=0. Specifically, the functions g' and h' for carrying out the inverse wavelet transformation with respect to the functions g and h, each of which is asymmetric with respect to the axis of n=0, are expressed as $$g[n]=g'[-n]$$
$$h[n]=h'[-n] \quad (3)$$

wherein [−n] represents the inversion with respect to the axis.

In the embodiment described above, the original image signal representing the radiation image is compressed. However, the method for compressing an image signal in accordance with the present invention is also applicable when an image signal representing an ordinary image is compressed.

For example, the method for compressing an image signal in accordance with the present invention may be applied when an image signal representing an image of a person as the major object, which is recorded on 35 mm negative film, is to be compressed. In such cases, the image is read out from the negative film by using a digital scanner, and the image signal representing the image is thereby obtained. The wavelet transformation is then carried out on the image signal by carrying out the filtering processing with the functions g and h. Thereafter, circular pattern matching and filtering with a flesh color filter are carried out on the wavelet transformation factor signal, which has been obtained from the wavelet transformation, and the pattern of the face of the person in the image is thereby determined. As for the image in which the pattern of the person is embedded, the information about the face pattern is most important, and the information about the background region is not necessary. Therefore, the labeling processing is carried out such that a value of 2 may be allocated to the region inside of the face pattern, and a value of 1 may be allocated to the other region.

Thereafter, the quantization is carried out in accordance with the results of the labeling processing such that a large number of bits (e.g., 8 bits) may be allocated to each picture element in the face pattern, and a small number of bits (e.g., 4 bits) may be allocated to each picture element in the other region. Encoding is then carried out, and the image signal is thereby compressed.

The original image signal can then be reconstructed by decoding the compressed image signal in the same manner as that in the aforesaid embodiment and then carrying out inverse wavelet transformation.

The compression processing is carried out in the manner described above. Therefore, also for an ordinary image, the signal compressibility can be kept high, while the image quality of the important image portion is being kept good.

In the embodiment described above, the degree of importance of each of different portions of the image is determined from the wavelet transformation factor signal of the lowest frequency band. In the wavelet transformation factor signals and the original image signal, the positions in the images represented by the respective signals correspond to one another. Therefore, the degree of importance of each of different portions of the image may be determined from the original image signal or from a wavelet transformation factor signal other than the wavelet transformation factor signal of the lowest frequency band.

What is claimed is:

1. A method for compressing an image signal, wherein compression processing is carried out on an original image signal representing an image, in which a predetermined object image is embedded, the method comprising the steps of:

i) carrying out wavelet transformation on the original image signal, the original image signal being thereby decomposed into image signals, each being of one of a plurality of different frequency bands;

ii) identifying image objects of the original image based on analysis of one of (a) the original image signal and (b) at least one of said image signals;

iii) dividing the original image into different portions corresponding to the identified image objects;

iv) determining a degree of importance of each of said different portions of the image based on its representation, from one of said image signals or from the original image signal;

v) carrying out labeling processing on the image signal, from which the degree of importance of each of different portions of the image was determined, in accordance with the determined degree of importance of each of different portions of the image, wherein said labeling processing may involve more than two types of labelings according to the number of degrees of importance of said different portions of the image;

vi) quantizing said image signals in accordance with the results of said labeling processing such that a larger number of bits is allocated to each of picture elements in a portion of the image determined as having a higher degree of importance and a smaller number of bits is allocated to each of picture elements in a portion of the image as having a lower degree of importance, wherein each of the image signals generated from the original image signal is quantized so that a finite number of bits is assigned to each of the image signals; and vii) encoding said image signals which have been quantized.

2. A method for compressing an image signal as defined in claim 1 wherein the image is a radiation image.

3. A method for compressing an image signal as defined in claim 2 wherein the radiation image is stored on a stimulable phosphor sheet.

4. A method for compressing an image signal as defined in claim 1 wherein the image is recorded on photographic film.

5. A method for reconstructing an image signal, wherein an original image signal is reconstructed from an image signal having been compressed with a method for compressing an image signal as defined in claim 1, the method for reconstructing an image signal comprising the steps of:

i) decoding said image signals, which have been encoded by a method for compressing an image signal as recited in claim 1, and ii) carrying out inverse wavelet transformation on said image signals, which have thus been decoded.

6. A method for compressing an image signal as defined in claim 1, wherein said determining step determines a degree of importance based on one or more of a shape and location of an object represented by the portion of the image.

7. A method for compressing an image signal as defined in claim 1, wherein said quantizing step relates to performing scaler quantization.

8. The method for compressing an image signal as defined in clam 1, wherein said analysis includes identifying a contour along an edge separating adjacent image objects.

9. The method for compressing an image signal as defined in claim 1, wherein said image objects include an irradiation field having a particular shape and location.

10. The method for compressing an image signal as defined in claim 1, wherein said step of carrying out wavelet transformation is performed prior to said identifying and dividing steps, and wherein said identifying step comprises identifying image objects of the original image based on analysis of one of said image signals.

11. The method for compressing an image signal as defined in claim 10, wherein said identifying step comprises identifying image objects from a wavelet transformation factor signal $WW_N$ which has been obtained from an Nth wavelet transformation and which is of a lowest frequency band of the original image signal.

12. The method for compressing an image signal as defined in claim 1, wherein said determining step determines the degree of importance based on a wavelet transformation factor signal $WW_N$ which has been obtained from an Nth wavelet transformation and which is of a lowest frequency band of the original image signal.

13. The method for compressing an image signal as defined in claim 1, wherein said quantizing step includes, for each of said different portions, quantizing said image signals within the portion such that a larger number of bits is allocated to lower frequency wavelets than to higher frequency wavelets.

* * * * *